(12) United States Patent
Schwartz et al.

(10) Patent No.: US 10,178,447 B2
(45) Date of Patent: Jan. 8, 2019

(54) SENSOR NETWORK SYSTEM

(71) Applicant: Palo Alto Research Center Incorporated, Palo Alto, CA (US)

(72) Inventors: David E. Schwartz, San Carlos, CA (US); Tse Nga Ng, Palo Alto, CA (US); Gregory Whiting, Menlo Park, CA (US); Anurag Ganguli, Milpitas, CA (US); George Daniel, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 47 days.

(21) Appl. No.: 14/806,983

(22) Filed: Jul. 23, 2015

(65) Prior Publication Data
US 2017/0026722 A1 Jan. 26, 2017

(51) Int. Cl.
| | |
|---|---|
| *H04Q 9/00* | (2006.01) |
| *H04W 4/00* | (2018.01) |
| *G01M 3/40* | (2006.01) |
| *H04W 4/70* | (2018.01) |
| *G01M 3/22* | (2006.01) |

(52) U.S. Cl.
CPC ............ *H04Q 9/00* (2013.01); *G01M 3/22* (2013.01); *H04W 4/70* (2018.02)

(58) Field of Classification Search
None
See application file for complete search history.

(56) References Cited

U.S. PATENT DOCUMENTS

| | | | | |
|---|---|---|---|---|
| 5,220,919 | A * | 6/1993 | Phillips | G01N 33/4972 128/903 |
| 5,991,032 | A * | 11/1999 | Atkinson | G01N 21/39 250/339.13 |
| 7,057,330 | B2 | 6/2006 | Buhler et al. | |
| 7,318,908 | B1 * | 1/2008 | Dai | G01N 33/551 422/50 |
| 8,256,286 | B2 | 9/2012 | Carroll et al. | |
| 8,414,831 | B2 * | 4/2013 | Jayatissa | G01N 33/0052 422/425 |
| 8,479,807 | B2 | 7/2013 | Short | |
| 8,685,600 | B2 | 3/2014 | Genta | |

(Continued)

OTHER PUBLICATIONS

Li et al., "Inkjet printed chemical sensor array based on polythiophene conductive polymers", Sensors and Actuators B 123, 2007, pp. 651-660.

(Continued)

*Primary Examiner* — Chico A Foxx
(74) *Attorney, Agent, or Firm* — Hollingsworth Davis, LLC

(57) ABSTRACT

A sensor network system that includes a sensor array having a plurality of sensor units that include a plurality of sensor elements, each sensor element configured to generate an electrical signal in response to a chemical environment in the vicinity of the sensor unit. The set of electrical signals generated by the sensor elements of the sensor unit represents a measured signature of the environment in the vicinity of the sensor unit. An analyzer is configured to extract the measured signatures of each sensor unit from sensor unit information signals and to detect a presence and concentration of one or more of the gases of interest based on the measured signatures.

21 Claims, 9 Drawing Sheets

(56) References Cited

U.S. PATENT DOCUMENTS

| | | | |
|---|---|---|---|
| 8,720,551 B2 | 5/2014 | Short | |
| 8,903,558 B2 | 12/2014 | Jarrell et al. | |
| 2002/0005580 A1* | 1/2002 | Goodman | G01N 33/0031 257/734 |
| 2003/0033032 A1* | 2/2003 | Lind | G01D 9/005 700/52 |
| 2004/0030667 A1* | 2/2004 | Xu | G06Q 40/08 |
| 2004/0060346 A1 | 4/2004 | Bonne et al. | |
| 2004/0075566 A1* | 4/2004 | Stepanik | G08B 21/12 340/632 |
| 2004/0136866 A1* | 7/2004 | Pontis | B82Y 10/00 422/400 |
| 2005/0145018 A1 | 7/2005 | Sabata et al. | |
| 2007/0179730 A1* | 8/2007 | Bornhoevd | G05B 23/0267 702/116 |
| 2008/0183389 A1* | 7/2008 | Chainer | G01V 3/00 702/2 |
| 2008/0286807 A1* | 11/2008 | Bakke | G01N 33/542 435/7.2 |
| 2009/0058663 A1* | 3/2009 | Joshi | G01D 11/24 340/584 |
| 2009/0093065 A1* | 4/2009 | Ding | B01L 3/022 436/180 |
| 2009/0112115 A1* | 4/2009 | Huang | A61B 5/083 600/532 |
| 2010/0090845 A1* | 4/2010 | Polak | G01N 21/3504 340/632 |
| 2011/0222438 A1* | 9/2011 | Wang | H04L 45/123 370/255 |
| 2012/0248092 A1 | 10/2012 | Uhland et al. | |
| 2013/0024134 A1* | 1/2013 | Lukasik | G01N 1/2205 702/29 |
| 2013/0031278 A1* | 1/2013 | Lin | H04L 67/12 710/17 |
| 2013/0053988 A1* | 2/2013 | Lin | G05B 15/02 700/83 |
| 2013/0197384 A1* | 8/2013 | Tang | G01N 33/497 600/532 |
| 2013/0300574 A1 | 11/2013 | Gillette, II | |
| 2013/0301674 A1 | 11/2013 | Gillette, II | |
| 2014/0138259 A1* | 5/2014 | Mickelson | G01N 33/0044 205/775 |
| 2014/0251021 A1* | 9/2014 | Keeter | G01L 15/00 73/753 |
| 2016/0029966 A1* | 2/2016 | Salas-Boni | A61B 5/02055 600/347 |
| 2016/0086087 A1* | 3/2016 | Ghouti | C01B 3/00 706/12 |
| 2016/0127172 A1* | 5/2016 | Shaw | H04W 4/008 709/223 |
| 2016/0254844 A1 | 9/2016 | Hull et al. | |

OTHER PUBLICATIONS

Oleum Tech Corporation, "Industrial Wireless Automation", 2 pages, 2014.

Ames Technology Capabilities and Facilities, "Carbon Nanotube Sensors for Gas Detection", Mar. 29, 2008, 2 pages.

File History for U.S. Appl. No. 15/150,939.

* cited by examiner

| GAS | TEMPLATE | |
|---|---|---|
| 1 ETHANE | $TEMPLATE_1$ | |
| 2 PROPANE | $TEMPLATE_2$ | |
| 3 METHANE | $TEMPLATE_3$ | |
| 4 HYDROGEN SULFIDE | $TEMPLATE_4$ | |
| 5 BASELINE | $TEMPLATE_5$ | |

FIG. 9

| GAS | TEMPLATE $X_1$ | TEMPLATE $X_2$ | TEMPLATE $X_3$ | | TEMPLATE $X_M$ |
|---|---|---|---|---|---|
| 1 ETHANE | $TEMPLATE_{1x1}$ | $TEMPLATE_{1x1}$ | $TEMPLATE_{1x1}$ | ••• | $TEMPLATE_{1xM}$ |
| 2 PROPANE | $TEMPLATE_{2x1}$ | $TEMPLATE_{2x1}$ | $TEMPLATE_{2x1}$ | ••• | $TEMPLATE_{2xM}$ |
| 3 METHANE | $TEMPLATE_{3x1}$ | $TEMPLATE_{3x1}$ | $TEMPLATE_{3x1}$ | ••• | $TEMPLATE_{3xM}$ |
| 4 HYDROGEN SULFIDE | $TEMPLATE_{4x1}$ | $TEMPLATE_{4x1}$ | $TEMPLATE_{4x1}$ | ••• | $TEMPLATE_{4xM}$ |
| 5 BASELINE | $TEMPLATE_{5x1}$ | $TEMPLATE_{5x1}$ | $TEMPLATE_{5x1}$ | ••• | $TEMPLATE_{5xM}$ |

FIG. 10

US 10,178,447 B2

SENSOR NETWORK SYSTEM

STATEMENT REGARDING FEDERALLY SPONSORED RESEARCH AND DEVELOPMENT

This invention was made with government support under contract number ARPA DE-AR0000542 (3780), awarded by ARPA-E (Advanced Research Projects Agency Energy). The U.S. Government has certain rights in this invention.

TECHNICAL FIELD

This disclosure relates generally to sensor systems that detect and identify gases and/or other analytes of interest and to related methods and devices.

BACKGROUND

Gas and other chemical leaks at sensitive installations such as oil wells, pipelines, chemical plants, and refineries can be catastrophic. These installations may cover a relatively large geographic area. Sensors may be deployed at multiple sites within the geographic area to provide monitoring for detection of gas leaks and other anomalies.

BRIEF SUMMARY

Some embodiments involve a sensor network system that includes a sensor array having a plurality of sensor units. Each sensor unit includes a plurality of sensor elements, at least some of the sensor elements in the sensor unit sensitive at least one gas of interest and being different in some functional respect from other sensor elements sensitive to the gas of interest. Each sensor element is configured to generate an electrical signal in response to a chemical environment in the vicinity of the sensor unit. The set of electrical signals generated by the sensor elements of the sensor unit represent a measured signature of the environment in the vicinity of the sensor unit. Each sensor unit includes aggregation circuitry configured to aggregate the electrical signals of the sensor elements into a sensor unit information signal. Each sensor unit includes communication circuitry configured to wirelessly transmit the sensor unit information signal to an external receiver. The sensor network includes at least one base station communicatively coupled to the sensor array and configured to receive sensor unit information signals from each of the sensor units of the sensor array. An analyzer is configured to extract the signatures measured by each sensor unit from the sensor unit information signals and to detect presence of one or more of the gases of interest based on the measured signatures.

Some embodiments are directed to a method that involves sensing using multiple sensing elements at least some of the sensor elements sensitive to an analyte of interest and being different in some functional respect from other sensor elements sensitive to the analyte. The sensor elements generate electrical output signals in response to the sensing. The set of electrical signals generated by the sensor elements of the sensor unit represent a measured signature of the environment in the vicinity of the sensor unit. The electrical output signals are aggregated into a sensor unit information signal which includes the measured signature. The sensor unit information signal is transmitted from the sensor unit to a base station which receives the sensor unit information signal. The measured signatures are extracted from the sensor unit information signal the presence and/or concentration of the gas is determined based on the measured signature.

BRIEF DESCRIPTION OF DRAWINGS

FIG. 9 illustrates a template library that includes template signatures of analytes of interest in accordance with some embodiments;

FIG. 10 illustrates a template library that includes template signatures that compensate for some factors that affect the measured signatures in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein relate to approaches for detection and/or identification of gases and/or other analytes of interest. The concepts are illustrated with respect to detection of gas leaks that may occur at facilities such as oil well pads, pipelines, refineries, and chemical plants. For example, the sensor system described herein can be used for detecting methane and other components of natural gas, including ethane, propane, butane, hydrogen sulfide ($H_2S$), benzene, and/or other organic and inorganic gases.

Approaches discussed below involve an array of sensor units, wherein each sensor unit is itself an array of individual sensor elements which generate an electrical output in response to the presence of an analyte of interest. At least some of the sensor elements in the sensor unit are different in some respect from other sensor elements of the sensor unit. The electrical output signals of the multiple sensor elements of the sensor unit can be aggregated and the aggregated signal (denoted the sensor unit information signal) is used to detect a presence of a gas, to identify the type of gas, and/or to determine other information about the gas such as the rate of a gas leak. Thus, approaches discussed herein involve an array of sensor units that can be used along with additional supporting circuitry to determine gas presence and/or identification.

Figure 1A:
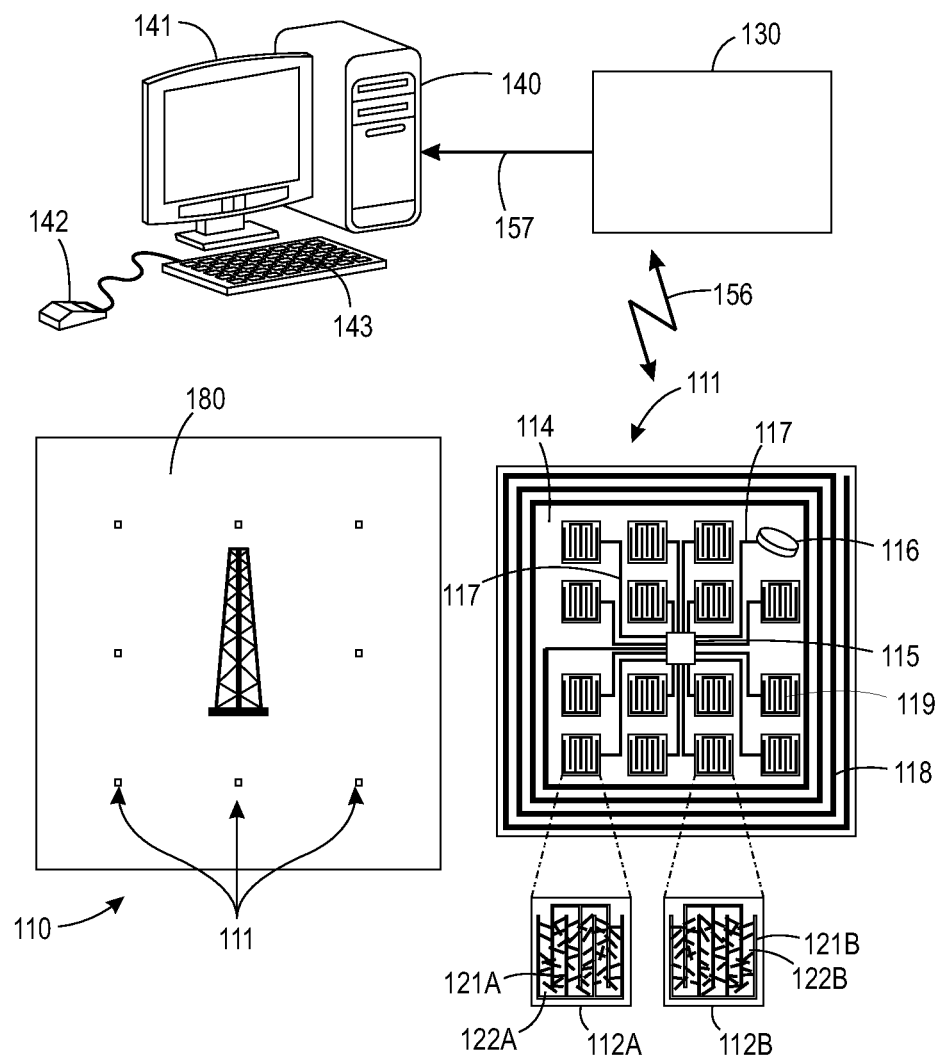
FIG. 1A is a block diagram of a sensor network system 100 in accordance with some embodiments.

FIG. 1A is a block diagram of a sensor network system in accordance with some embodiments. The system may be used to sense for the presence of gases at various locations of a geographic area of interest 180. In some embodiments, the sensor system described herein is capable of detecting methane and other components of natural gas, including ethane, propane, butane, hydrogen sulfide ($H_2S$), benzene, and/or other organic and inorganic gases.

A sensor array 110 comprises a number of sensor units 111 that are arranged in various locations within or near the geographic area of interest 180. In the example of FIG. 1A, the geographic area of interest is a gas well site. Sensor units of the sensor array may be deployed along a gas pipeline, in a refinery or other processing facility instead of, or in addition to, in the proximity of the well head as illustrated in FIG. 1A. The sensor locations may be computed to provide optimal sensor locations to achieve a particular objective, e.g., optimal sensing of a parameter of the gases of interest such as leak location detection, leak rate detection, etc. For example, the optimal sensor locations may be determined by minimizing or maximizing a global objective function to achieve the optimal locations.

Figure 1B:
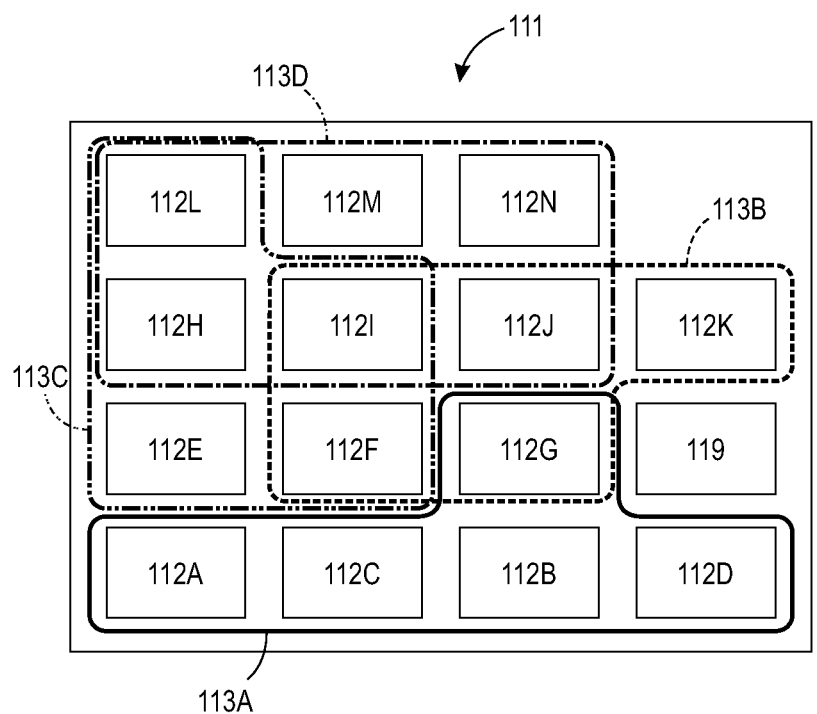
FIG. 1B is a diagram of a sensor unit comprising multiple sensor elements in accordance with some embodiments.

Each sensor unit 111 is self-contained, battery powered, and includes multiple sensor elements 112$a$-$n$ as shown in FIG. 1B. Each sensor unit may include an energy harvesting component, e.g., solar, wind, and/or motion activated energy harvesting component that is coupled to maintain the battery charge, or used in place of the battery. In the example of FIG. 1A, the sensor units 111 are arrays of gas sensor element 112$a$-$n$ comprising variously functionalized CNTs and other nanomaterials. The sensor units 111 may include an environmental sensor such as temperature sensor 119.

Each sensor element 112$a$-$n$ is configured to generate an electrical signal in response to one or more gases of interest that interact with the sensor element. The set of electrical signals generated by the sensor elements 112$a$-$n$ of a sensor unit 111 represents a measured signature of the environment in the vicinity of the sensor unit. In some embodiments, multiple sensor elements in each sensor unit can be sensitive to the same set of gases of interest. At least some of the sensor elements 112$a$-$n$ that are sensitive to a particular gas or a particular set of gases of interest are different in some functional aspect when compared to other sensor elements 112$b$ that are sensitive to the same particular gas or set of gases.

For example, the sensor elements may differ in functional aspects such as 1) the sensitivity of the sensor elements to the gas of interest, 2) the relative sensitivity of the sensor to the gas of interest and another gas or between two distinct gases of interest, 3) the specificity of the sensor elements, e.g., the capability of a sensor element to identify a gas in a mixture, 4) the response time of the sensor elements which involves the time it takes for the sensor element to detect a gas of interest.

For example, at least one of the sensor elements of the sensor unit may use a different sensor material that gives a different response to a gas of interest when compared with at least one other sensor element of the sensor unit. As another example, at least one of the sensor elements of the sensor unit may use a different type of sensor than at least one other sensor element of the sensor unit, e.g., one sensor element may comprise a capacitive sensor element that responds to a gas of interest whereas another sensor element may comprise a resistive sensor element that responds to the gas of interest. This approach enhances detection and/or identification of a gas of interest by aggregating multiple sensor outputs that both individually and collectively provide information about a gas of interest. Because multiple sensors are used, the approach can provide for sensing a wider range of gases than can be sensed using a single sensor. The approach can additionally provide for redundancy—in the event of failure of one sensor element that is sensitive to a particular gas, the output of other sensor elements that are sensitive to that particular gas can be used to detect the gas presence. In some applications, redundancy can be achieved through the use of multiple nominally identical sensor elements. Further, the approach provides a more accurate determination of the gases of interest because it relies on the aggregated outputs of multiple sensors sensitive to the same gas(es) of interest.

FIG. 1B illustrates sensor elements 112$a$-$n$ of a sensor unit 111. In this example, there are four gases, Gas A, Gas B, Gas C, Gas D that are sensed by various combinations of sensors 112$a$-$n$. Gas A is sensed primarily by group 113$a$ of sensor elements 112$a$-$d$ and 112$g$; Gas B is sensed primarily by group 113$b$ of sensor elements 112$f$, 112$g$, 112$i$-$k$; Gas C is sensed primarily by group 113$c$ of sensor elements 112$e$, 112$f$, 112$h$, 112$i$, and 112$l$; Gas D is sensed primarily by group 113$d$ of sensor elements 112$h$-$j$ and 112$l$-$n$ At least one sensor element in groups 113$a$, $b$, $c$, and/or $d$ is sensitive to the same gas and is different in some functional respect to at least one other sensor element of the same group. FIG. 1B illustrates one simple example of a sensor unit. In general, the scenarios may be more complex and/or may utilize multiple sensor elements to identify a single gas.

Returning now to FIG. 1A, each sensor unit 111 includes circuitry configured to process, aggregate, and/or communicate sensed information obtained from the sensor elements. For example, in some embodiments, the sensor unit circuitry includes aggregation circuitry configured to aggregate the electrical signals of the sensor elements 112$a$-$n$ into a sensor unit information signal that comprises the measured signature of the environment in the vicinity of the sensor unit. For example, the chemical environment may include one or more gases of interest. The aggregation circuitry 115 may include, for example, a multiplexer (MUX) and an analog to digital converter (ADC) wherein the MUX multiplexes outputs 117 of the sensor elements 112$a$-$n$ into the ADC for conversion from analog to digital form. The sensor unit circuitry may include communication circuitry 118 such as an antenna, resonant capacitor, transmitter, and/or other circuitry that facilitates communication by the sensor unit 111 over a wireless communication channel 156 to an external receiver. In embodiments in which the sensor units are capable of bi-directional communications, the communication circuitry may also include a wireless receiver.

Each of the sensor units 111 is configured to wirelessly communicate its sensor unit information signal to an external receiver. In some embodiments, the external receiver is located in a base station 130 and in some embodiments, the external receiver is located in another sensor unit. In some embodiments, the base station 130 is configured to aggregate the sensor unit information signals and to send the aggregated sensor unit information signal to an analyzer. In some embodiments, the base station 130 includes a weather station to measure environmental conditions such as relative humidity, wind speed, wind direction, and/or other environmental conditions. The measurements of environmental conditions provided by the base station may be used by the analyzer during analysis of the sensor unit information signals.

An analyzer 140 is configured to extract the measured signatures from the sensor unit information signals of each sensor unit. The analyzer 140 operates by pattern matching the measured signatures obtained from the sensor unit information signals based on a known data set. The known data set may comprise a set of weightings or other parameters that are used in conjunction with a machine learning process and/or an electronic neural network. In some embodiments, the pattern matching may involve the use of a model is that is developed through a training process such that the analyzer makes predictions about the identity of the gas and is provided with correction information for erroneous predictions. The training process continues until the model achieves a desired level of accuracy on the training data. The model may include a set of weightings or other parameters in the machine learning algorithm.

For example, in some embodiments, the measured signatures are compared to known template signatures of one or more gases of interest. In the example system shown in FIG. 1A, the analyzer 140 is represented as a separate unit that is in communication with the base station 130 via communication channel 157. However, in some embodiments, all or some of the functionality of the analyzer 140 may be included in the base station itself. In some embodiments, all or some of the functionality of the analyzer 140 may be distributed among the sensor units 111. In some embodiments, the analyzer 140 can include a user interface, e.g., in the form of an output device, e.g., display 141, and input devices, e.g., pointing device 142, keyboard 143 that allow a user to interact with other components of the system shown in FIG. 1A. Optionally, intermediate wireless signal boosters and/or data processing units can be included in the system.

In some embodiments, various components of each sensor unit 111 are printed. For example, in some embodiments the sensor elements 112a-n are printed. In some embodiments additional circuitry of the sensor unit, e.g., aggregation circuitry 115, interconnects 117, antenna 118, and/or temperature sensor 119, that facilitates read out, processing, and/or communication of the sensor signals may also be printed. Alternatively, the additional circuitry can be made of discrete and/or integrated (non-printed) components. Printed sensor elements 112a-n, printed interconnects 117, and/or other printed circuitry 115, 118, 119 can be deposited from solution by various printing or coating techniques. Useful techniques for printing the sensor elements, interconnects and/or other circuitry include ink-jet printing, screen printing, gravure printing, flexographic printing, dispenser printing, extrusion printing, spin coating, slot dye coating, and microarray spotting, for example. In some embodiments, the sensor material, sensor electrodes, interconnects between the sensor and other components, environmental sensors, thin-film transistors (TFTs) and/or other components to multiplex, process, convert to digital form, and/or otherwise condition and/or communicate the sensor signals may be printed.

The components of the sensor units 111, e.g., printed sensor elements, interconnects and/or additional circuitry may be printed or otherwise disposed on a flexible substrate. For example the substrate may be or comprise polyethylene terephthalate (PET), polyethylene naphthalate (PEN), polyimide, or other flexible plastics, flexible glass, flexible metal, e.g., stainless steel, or other suitable flexible materials. In some embodiments the substrate may be rigid.

Figure 1C:
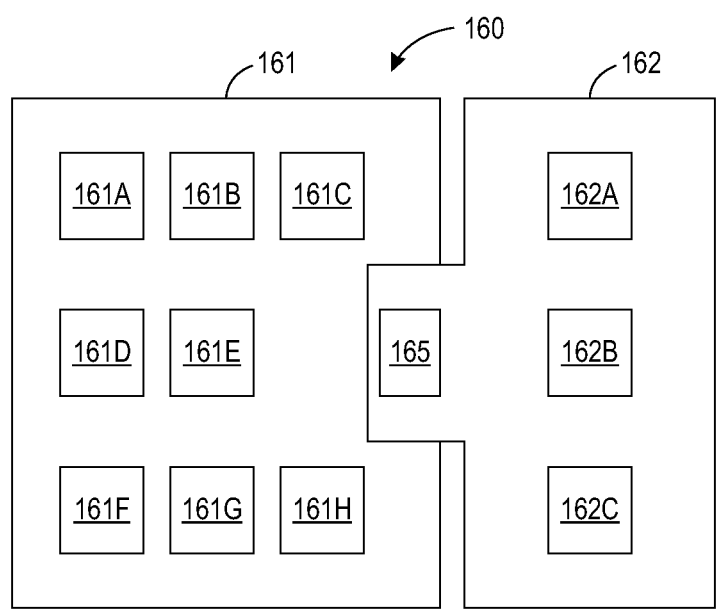
FIG. 1C is a diagram of a multi-substrate sensor unit in accordance with some embodiments.

In some embodiments, the sensor unit 111 may comprise a single substrate 114, as shown in FIG. 1A, with the components and interconnects 112, 115, 116, 117, 118, 119 of the sensor unit 111 disposed on the single substrate 114. In other embodiments, the sensor unit may include two or more substrates, each substrate containing some but not all of the components of the sensor unit. For example, FIG. 1C illustrates a multiple substrate sensor unit 160 that includes a first substrate 161 that supports a first set of components 161a-h and a second substrate 162 that supports a second set of components 162a-c. The first and second substrates 161, 162 may be electrically connected by a connector 165. In multi-substrate embodiments, one substrate may support printed components and/or less expensive, disposable components, e.g., printed sensors and the other substrate may comprise a circuit board with conventional electronics, e.g., integrated circuits. The substrate with printed components may be made to be inexpensive and disposable at the end of the printed components' lifetime. The substrate with conventional, more expensive components could be used for a longer period of time, thus reducing the overall system cost.

The printed sensor elements 112a-n may be any type that responds to an input with an electrically discernable output. In general, the input can be a physical property (such as temperature, strain, pressure), a chemical property, or a biological property. For example, printable sensors that are sensitive to physical properties can include compliant capacitors or resistors that change capacitance or resistance based on temperature, pressure, and/or strain. Materials for the sensors for physical properties may include, for example, conductive rubber-carbon composites (for pressure and strain), oxides, and conducting polymers (for temperature), etc.

Chemical or gas sensors can comprise sensing materials that react to a gas or other analyte by adsorbing or otherwise interacting with the analyte, thereby changing the resistivity, capacitance, or other electronic property of the sensing material. One example of a chemical sensor is a resistive chemical sensor. The resistive chemical sensor comprises conductive (e.g., interdigitated metal) electrodes bridged by a sensor material that changes resistivity in the presence of the chemical or gas of interest. The sensor material and interdigitated electrodes can be printed.

Suitable sensing materials include n-type or p-type metal oxide semiconductors, e.g., comprising non-transition (e.g., $Al_2O_3$, $SnO_2$, ZnO) and transition metal oxides (e.g., $TiO2$, $V_2O_5$, $WO_3$, $Fe_2O_3$). Metal oxide semiconductor sensors can be used to detect target gases through redox reactions between the target gases and the oxide surface. During the redox reactions, O— distributed on the surface of the sensor materials reacts with molecules of target gases, leading to an electronic variation of the oxide surface.

Combustible, reducing, or oxidizing gases can be detected using resistive sensors based on metal oxides, such as $SnO_2$, CuO, $Cr_2O_3$, $V_2O_5$, $WO_3$ and $TiO_2$. Tin dioxide ($SnO_2$) and/or $WO_3$ are sensor materials that can be used to detect presence and/or concentration of gases such as liquefied petroleum gas (LPG), methane (CH4), carbon monoxide (CO) and other reducing gases hydrogen (H2) and nitrogen oxide (NO).

Sensor materials that may be useful for embodiments described herein include conducting or non-conducting polymers which are affected through exposure to organic and inorganic gases. Conducting polymers that can be used as gas sensing materials include polypyrrole (PPy), polyaniline (PAni), polythiophene (PTh) and their derivatives.

The conducting polymers may be doped to increase their conductivity making them suitable for sensing materials.

Non-conducting polymers have been widely utilized as sorptive coatings on different sensor devices. For instance, polymer layers causing changes in resonance frequency, dielectric constant, and/or enthalpy upon absorption/desorption of a gas can be coated on mass-sensitive, capacitive (dielectric) and/or calorimetric sensor devices. Examples of mass-sensitive sensor devices include Quartz Crystal Microbalance (QCM), Surface Acoustic Wave (SAW) and Surface Transverse Wave (STW)). These sensor devices convert changes in the monitored polymer properties into an electrical signal output Polymer-based gas sensors can provide relatively high sensitivities, short response times, temperature operation, and low energy consumption. Their low energy consumption makes polymer-based gas sensors useful in battery-driven applications.

Additional examples of sensor materials of interest include carbon nanotubes (CNTs), e.g. single-walled carbon nanotubes (SWCNTs) and multiwall carbon nanotubes (MWCNTs), which interact strongly by changing electrical properties in the presence of a chemical or gas of interest. CNTs possess electrical properties and can be highly sensitive to extremely small quantities of gases, such as alcohol, ammonia ($NH_3$), oxygen ($O_2$) carbon dioxide ($CO_2$) and nitrogen oxide (NOx) at room temperature. CNTs also provide suitable adsorptive capacity, large surface-area-to-volume ratio and quick response time, resulting in significant changes in electrical properties, such as capacitance and/or resistance.

When utilized as sensing materials, CNTs can be doped, coated or functionalized with other materials in order to enhance their sensitivity and selectivity. By doping, functionalizing, coating, or otherwise modifying the CNTs, the relative interaction with different gases can be changed. For example, Pd nanoparticles may be added to the CNTs to increase sensitivity to methane.

In some applications, CNTs could also be incorporated into other sensing materials, such as metal oxide semiconductors, to improve their sensitivity. Gas sensors based on graphene are also possible.

By utilizing multiple sensors with differently-prepared sensor materials in an array, the response of the collection of sensors to a given gas or chemical can form a "signature", uniquely distinguishing that gas or chemical from others. The "signatures" can be determined by training the sensor array in the presence of different gases and using data analysis techniques, such as principal component analysis.

The sensor materials that are sensitive to an analyte of interest may additionally be sensitive to environmental conditions, such as temperature, humidity, and light which confound the response of these sensors to the analyte of interest. Environmental sensors, e.g., temperature sensor 119, humidity, light sensors, etc., can be included in the system, either on the sensor unit 111, and/or at the base station 130 and/or elsewhere. In some cases, the environmental sensors may be printed or non-printed sensors. The output of these environmental sensors can be used to compensate for the environmental factors in the outputs of the sensor elements that sense the analyte of interest. The environmental factors can be taken into account in analysis of the sensor signals by training and data analysis algorithms.

The sensor unit 111 might include a battery 116 for power, passive electronic components (resistors, capacitors, inductors, crystals), etc., integrated circuits for multiplexing, reading in the sensor signals, wireless communication, etc., mechanical switches; displays; etc. that are not printed. These discrete components can be bonded to the substrate of the sensor unit with epoxy or another suitable bonding agent and electrically connected with conductive inks, conductive epoxy, or other suitable materials.

Resistive sensors provide one example of a sensor type that can be included in the array. Other types of sensor types that can be included include capacitive sensors, ion-selective field-effect transistors, two- or three-electrode electrochemical sensors, and/or other types of sensors.

In some scenarios, the sensor units may need to be protected from the environment. This can be accomplished with an encapsulant or laminated material that may or may not be porous. In some implementations the units may also be seated in an enclosure, e.g., a hermetically sealed enclosure. The number of sensor units and/or the arrangement of sensor units in a sensor array can be varied for different applications. The sensor system disclosed herein can be adapted to various geometries, such as the well pad implementation shown in FIG. 1A or along a pipeline.

Figure 2:
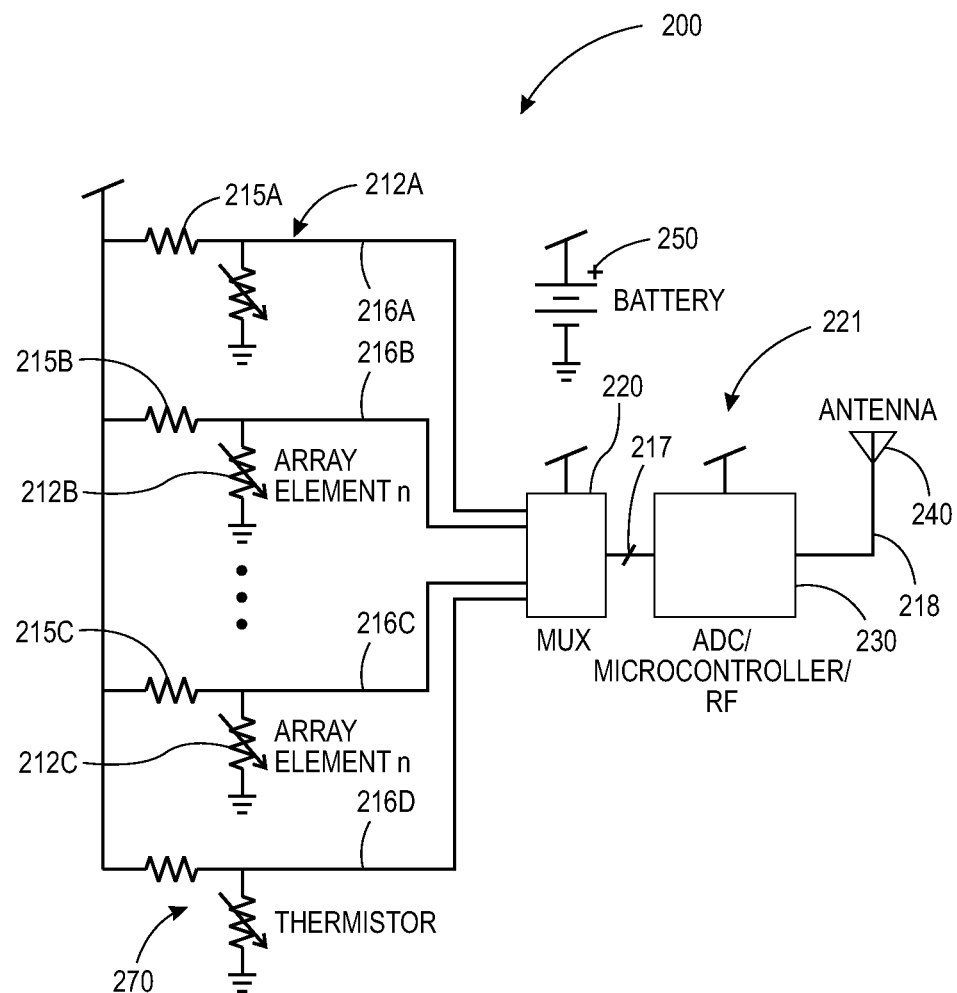
FIGS. 2 through 4 schematically illustrate a sensor unit, base station, and remote receiver and analyzer in accordance with some embodiments.
Figure 3:
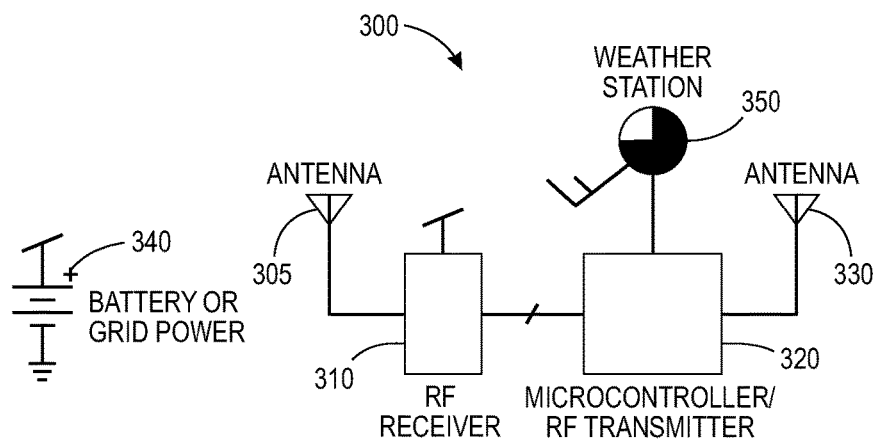
Figure 4:
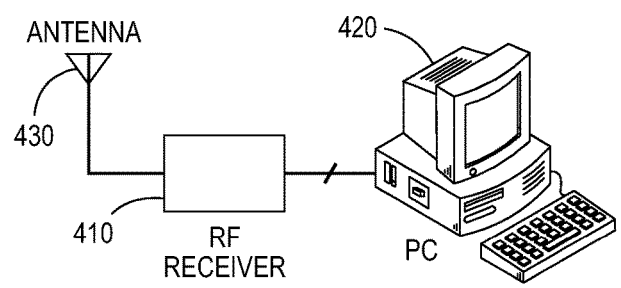

FIGS. 2 through 4 schematically illustrate a sensor unit 200, base station 300, and remote receiver and analyzer 400 in accordance with some embodiments. In this embodiment, the sensor unit 200 includes multiple resistive sensor elements 212a-c. Each sensor element 212a-c is respectively electrically coupled to a resistor 215a-c to form voltage dividers that facilitate readout of the sensor signals from the sensor elements 212a-c. The sensor unit 200 is self-contained and includes battery 250. Aggregation circuitry 221 includes a multiplexer 220 configured to multiplex the sensor signals from the sensor elements 212a-c into the input of an ADC which may be implemented in microcontroller chip 230. The sensor signals of the sensor elements 212a-c are aggregated in the microcontroller 230 and the sensor unit information signal comprising the aggregated sensor signals is communicated wirelessly to an external receiver via an antenna 240. The sensor unit may include an environmental sensor such as thermistor 270. In some embodiments, the sensor elements 212a-c, resistors 215a-c, interconnects 216a-d, 217, 218m thermistor 270, and antenna 240 are printed and the MUX 220 and ADC/microcontroller 230 are non-printed components.

In some configurations, the electronics in the sensor unit, e.g., microcontroller 230 may preprocess the signals from the sensor elements 212a-c to remove noise, and/or reduce the power required, for example, by reducing the quantity of data that needs to be transmitted. In some embodiments, the sensor unit will have a low-power sleep mode, and periodically awaken. During awake mode, the sensor elements may be energized to sense the analyte of interest and/or the sensor unit electronics may communicate data to an external receiver.

In some embodiments, the external receiver is located in the base station 300. The base station is an electronic system that receives the sensor unit information signals wirelessly from the sensor units via communication circuitry such as an antenna 305 and receiver 310, e.g., a radio frequency (RF) receiver.

The base station 300 can include circuitry, e.g., microcontroller 320, configured to process the sensor information signals, and may aggregate the sensor unit information signals to form an aggregated sensor unit information signal. Each sensor unit information signal is the aggregated sensor signals from the sensor elements of a sensor unit and the aggregated sensor unit information signal is the aggregated sensor information signals received from each sensor unit.

In some implementations, the base station 300 may perform some signal processing of the sensor unit information signals and/or the aggregated sensor unit information signal, e.g., by amplifying, filtering, etc.

In some embodiments, the base station 300 includes a weather station 350 configured to measure environmental parameters such as temperature, relative humidity, rainfall, wind speed, and/or wind direction. In some embodiments, the base station 300 does not itself include the weather station, but the base station 300 is communicatively coupled to a server that provides weather information to the base station 300.

Communication circuitry of the base station 300 includes a transmitter and antenna 330 configured to communicate one or more of the sensor unit information signals and/or the aggregated sensor unit information signal wirelessly to remote receiver 410 shown in FIG. 4. In some configurations, the base station 300 may transmit one or more of the sensor information signals and/or the aggregated sensor information signal from the transmit antenna 330 of the base station 300 to the receive antenna 430 and receiver circuitry, e.g., RF receiver 410, of the remote receiver via a more powerful wireless communication link than the communication links used to transmit the sensor unit information signals to the base station. In some configurations, the base station may communicate one or more of the sensor information signals and/or the aggregated sensor information signal by a wired communication link, e.g., over the internet, to the remote receiver 410. An analyzer 420 and/or user interface may be located at the location of the remote receiver 410. The analyzer can be configured to implement software instructions to analyze the received information and/or to interact with a user.

Having multiple sensor units serves several purposes. It allows for redundancy so that the system remains operational even if some units fail. It allows detection of gases in multiple places on the target site, so that gas can be sensed independent of the direction of the wind. The use of multiple sensor units allows determination of such parameters as the gas presence, gas concentration, location of the source of the gas, the direction of the gas leak and/or the rate at which the gas is being released. These parameters may be determined by the analyzer based on model-based or model-free statistical analysis techniques. The statistical analysis techniques include, but are not limited to, parametric approaches such as Maximum Likelihood Estimation (MLE) and/or Best Linear Unbiased Estimation (BLUE) and non-parametric approaches, e.g., based on estimating the direction of the concentration gradient of the gas.

Implementation of the sensor network system can be enhanced if the system has information about the location of the sensor units. Location information can be provided by a sensor, such as a GPS chip, on the unit itself, by the installer upon installation of the units, or by the unit itself. For example, each unit may have location information stored in its memory which the sensor unit communicates to the base station and/or analyzer in the sensor unit information signal along with the aggregated sensor signals.

Figure 5:
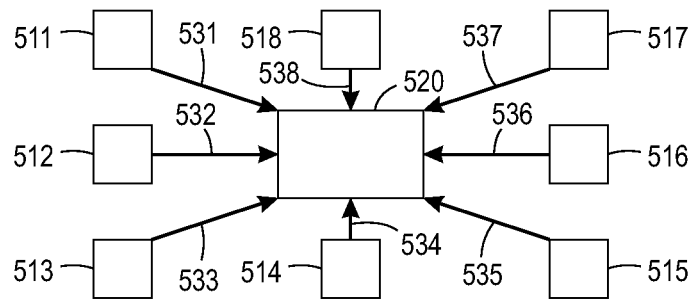
FIGS. 5-7 illustrate various ways that the sensor units in a sensor array can be communicatively coupled to a base station according to some embodiments.
Figure 6:
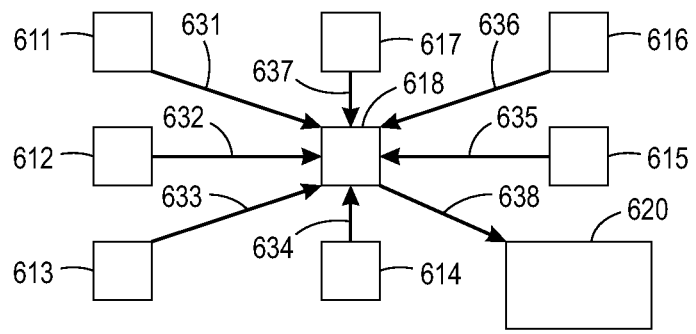
Figure 7:
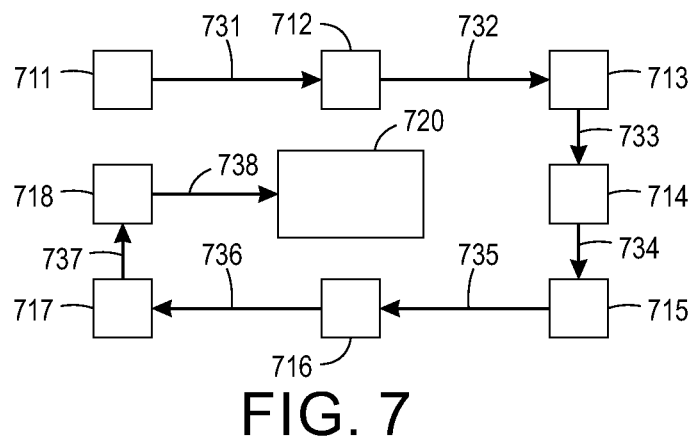

FIGS. 5-7 illustrate various ways that the sensor units in a sensor array can be communicatively coupled to a base station. Although only one base station is indicated in FIGS. 5-7, in some embodiments multiple base stations can be used. The use of multiple base stations may be appropriate when the geographical area of interest is large.

As illustrated in FIG. 5, each sensor unit 511-518 may be communicatively coupled to the base station 520 through wireless communication channels 531-538 established between a sensor unit 511-518 and the base station 520. In FIG. 6, sensor units 611 through 617 are communicatively coupled to sensor unit 618 through communication channels 631-637 and sensor unit 618 is communicatively coupled to the base station 620 through communication channel 638. In FIG. 7, each sensor unit 711-718 communicates with another sensor unit in a chain configuration with each sensor unit communicating its sensor information signal to another sensor unit over channels 731 through 747, with the final sensor unit 718 communicating with the sensor unit information signals to the base station 720. The chain configuration shown in FIG. 7 may be useful, for example, when the system is implemented along a pipeline.

In some embodiments, the sensor units are configured to form an ad-hoc or self-forming network. In such a network, data are communicated from each unit to one or more others, which then communicate with yet others, until the data reach the base station.

In some embodiments, the base station and remote receiver are combined into a single unit that receives the data from the sensor units, processes it, and interacts with the user.

Figure 8:
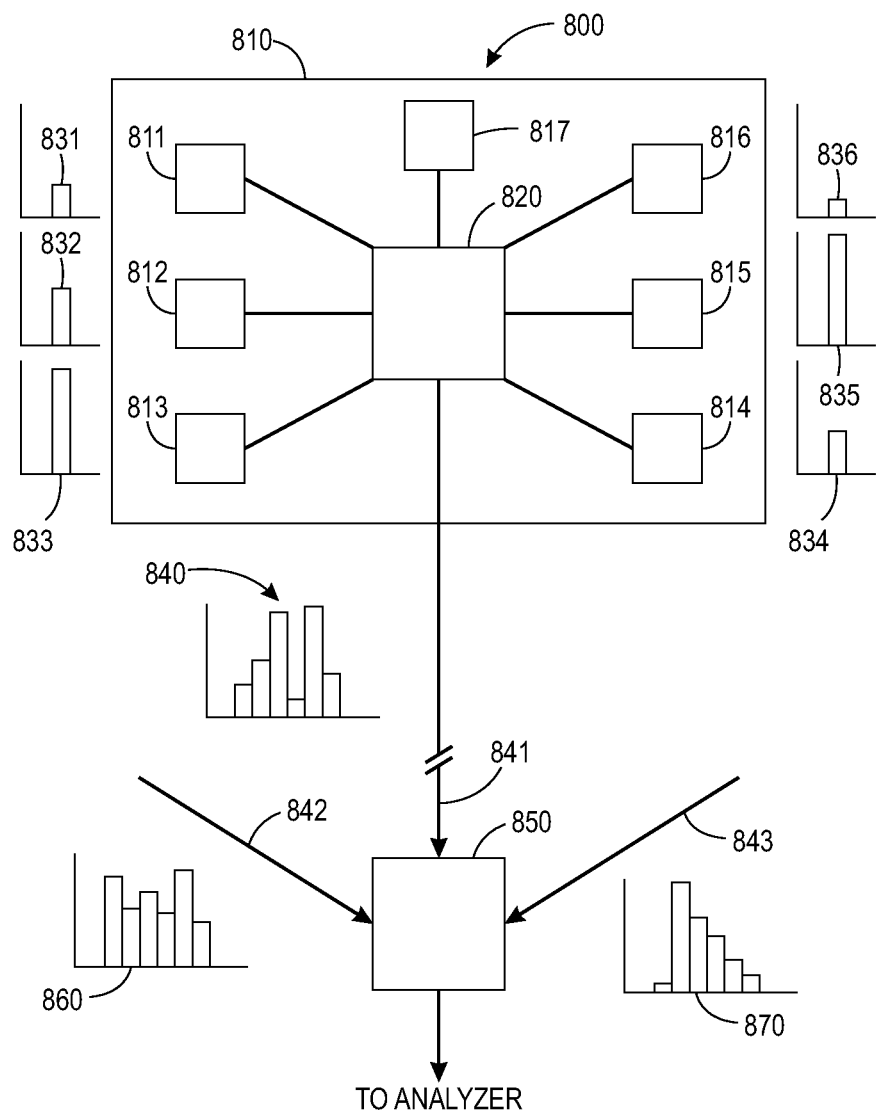
FIG. 8 diagrammatically illustrates aggregation of signals from individual sensor elements of a sensor unit into a sensor unit information signal and communication of the sensor unit information signal to a base station or other external receiver in accordance with some embodiments.

FIG. 8 diagrammatically illustrates aggregation of signals from individual sensor elements of a sensor unit into a sensor unit information signal and communication of the sensor unit information signal to a base station (or other external receiver). FIG. 8 depicts a portion of a system 800 that includes a sensor unit 810 that includes four sensor elements 811-814 configured to measure one or more analytes of interest. In response to the presence of at least one of the analytes of interest, sensor element 811 generates electrical signal 831; sensor element 812 generates electrical signal 832; sensor element 813 generates electrical signal 833; sensor element 814 generates electrical signal 834; sensor element 815 generates electrical signal 835; and sensor element 816 generates electrical signal 836. Each of the sensor element signals 831-836 are aggregated in the aggregation circuitry 820 to form the sensor unit information signal which comprises the signature 840 of the chemical environment of the sensor unit which includes analyte. The sensor unit 810 transmits its sensor unit information signal that includes the signature 840 to the base station 850 over communication channel 841. In some implementations, the sensor unit 810 may include one or more environmental sensors 817. If so, information from the environmental sensors 817 is included in the sensor unit information signal in addition to the signature 840. Additionally the sensor unit information signal may include other metadata, such as the identification of the sensor unit, the location of the sensor unit, a time stamp indicating the time the sensor signals were obtained, the age/degradation condition of the sensor unit, etc. As shown in FIG. 8, in the illustrated embodiment, additional sensor units in the array (not shown in FIG. 8) transmit their sensor unit information signals over communication channels 842, 843 to the base station 850. The sensor unit information signals of the additional sensor units include the signatures 860, 870 measured at the locations of the additional sensor units.

In some embodiments, the base station 850 may aggregate the sensor unit information signals received from that sensor unit 810 and the additional sensor units to an analyzer. Alternatively, the base station may send the sensor unit information signals in separate messages to the analyzer, e.g., on command by the analyzer or when the sensor information signal is received by the base station from the sensor unit. In some implementations, the base station may be communicatively coupled to a wireless cellular network and may send the sensor unit information signals via the wireless cellular network, e.g., as a short message service (SMS) message. In remote locations, the base station may be wirelessly coupled to the analyzer wirelessly through a satellite link.

The analyzer processes the sensor unit information signals and may determine whether one or more analytes of interest are present at the locations of the sensor units, the amounts of the analytes that are present, and/or other information about the analytes of interest.

In some embodiments, the analysis includes extraction of the signatures contained in the sensor unit information signals and comparison of the signatures to template signatures representative of the one or more analytes of interest. The template signatures may be stored in a template library 900 of the analyzer, as illustrated in FIG. 9. For example, as shown in FIG. 9, the template library 900 may include one or more template signatures of the analytes of interest, such as template signatures for ethane, propane, methane, butane, $H_2S$, benzene and/or other analytes of interest. The template library 900 in this example includes five template signatures: a first template signature ($Template_1$) characterizes ethane; a second template signature ($Template_2$) characterizes propane; a third template signature ($Template_3$) characterizes methane; a fourth template signature ($Template_4$) characterizes $H_2S$. In some embodiments, the template library 900 includes a baseline template signature ($Template_5$) that characterizes a baseline condition that occurs when none of the analytes of interest are present.

In some scenarios, various factors may affect the signatures measured by the sensor units. Such factors may include, for example, environmental factors, e.g., temperature, humidity, wind speed, etc.; physical factors, e.g., altitude, strain; and/or sensor unit related factors, such as differences between sensor units which may be intrinsic differences or may be related to age and degradation of the sensor unit. In some embodiments, the template signatures stored in the template library compensate for one of these factors or a combination of the factors. FIG. 10 illustrates a template library 1000 that includes template signatures, $Template_{1X1}$-$Template_{5XM}$ that can be used to detect the four analytes of interest, ethane, propane, methane, $H_2S$, as well as the baseline condition, under M different presentations of a factor (or factors) that affect the measured signatures.

As an example, consider the scenario wherein the factor X is age of the sensor units. In this scenario, the signatures measured by the sensor units change over time in a deterministic manner as the sensor units age. To compensate for changes due to age of the sensor units, the template library 1000 includes a set of templates, $Template_{1X1}$-$Template_{4X1}$ characterizing the signatures of the analytes of interest and the baseline signature $Template_{5X1}$ at a first age; a set of templates, $Template_{1X2}$-$Template_{4X2}$ characterizing the signatures of the analytes of interest and the baseline signature $Template_{5X2}$ at a second age, etc. up to M different ages. As the sensor units age, the analyzer chooses the appropriate template for comparison to the measured template for the sensor unit. Note that sensor units or an array need not be of the same age. If the analyzer stores or is otherwise provided with the age of each sensor unit, the analyzer selects the correct set of templates for each sensor unit. Thus, the analyzer may select template set $Template_{1X1}$-$Template_{5X1}$ for analyzing the sensor unit information signal from a relatively new sensor unit and may select template set $Template_{1X3}$-$Template_{5X3}$ for analyzing the sensor unit information signal from a relatively older sensor unit. The factor X illustrated in FIG. 10 may be any factor or combination of factors that affect the measured signatures.

Figure 11:
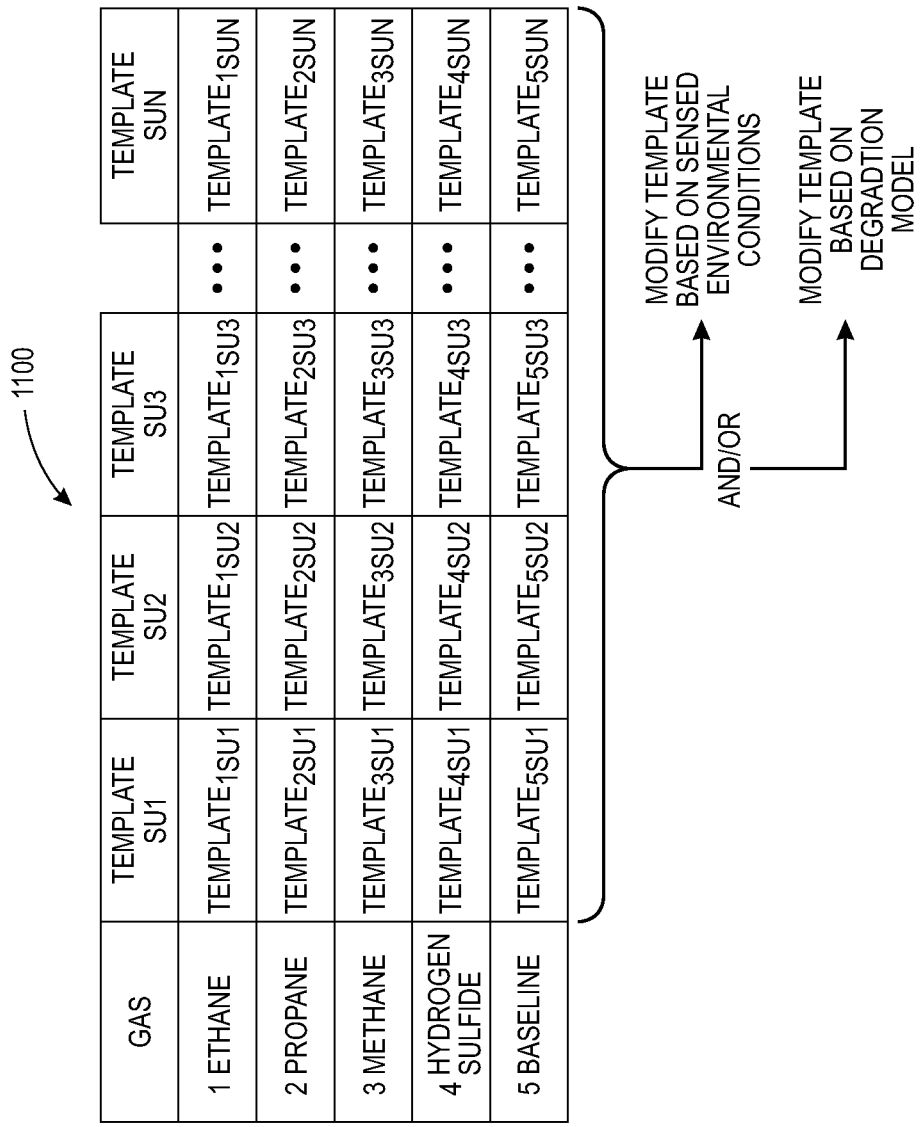
FIG. 11 illustrates a template library that includes a set of template signatures for each sensor unit or for groups of sensor units wherein the template signatures may be modified by a model of one or more physical, environmental, or temporal factors.

As shown in FIG. 11, in some scenarios, it may be useful to have a template library 1100 that includes a set of templates for each sensor unit (or for groups of sensor units) because of intrinsic differences in the sensor units, even when the sensor units are of similar age and/or degradation state. Template library 1100 includes a template set for each of N sensor units (or groups of sensor units) SU1 through SUN. Thus, the analyzer chooses template set $Template_{1SU1}$ through $Template_{5SU1}$ when analyzing the measured signatures of sensor unit 1; the analyzes chooses template set $Template_{1SU2}$ through $Template_{5SU2}$ when analyzing the measured signatures of sensor unit 2; template set $Template_{1SU3}$ through $Template_{5SU3}$ when analyzing the measured signatures of sensor unit 3, and so forth.

In some embodiments, the analyzer may be configured to modify stored template signatures based on a model that reflects expected changes in the measured signatures of the sensor units due to a variety of factors, e.g., environmental, physical, and/or temporal factors. Although this approach may be used in conjunction with any template library, e.g., libraries 900 and 1000 of libraries of FIGS. 9 and 10, the template library 1100 shown in FIG. 11 is used to illustrate the concept of adapting the templates based on modeled changes in the measured signatures.

Template library 1100 includes a template set for each of N sensor units (or groups of sensor units) SU1 through SUN. Thus, the analyzer chooses template set $Template_{1SU1}$ through $Template_{5SU1}$ when analyzing the measured signatures of sensor unit 1; template set $Template_{1SU2}$ through $Template_{5SU2}$ when analyzing the measured signatures of sensor unit 2; template set $Template_{1SU3}$ through $Template_{5SU3}$ when analyzing the measured signatures of sensor unit 3, and so forth. Additionally, the analyzer adapts the selected template set based on a model of expected changes in the signatures measured by the sensor units. As illustrated in FIG. 11, the analyzer may adapt a selected template set based on a model that characterizes changes that occur in the measured signatures due to degradation of the sensor units. Additionally or alternatively, the analyzer may adapt a selected template set based on a model that characterizes changes that occur in the measured signatures due to environmental conditions. FIG. 11 provides an example of using degradation-based and environment-based models to adapt the templates, however, the models can be used to adapt the template set for other factors as well, e.g., physical factors such as strain, etc. In some embodiments, the analyzer may be provided with the model. In some embodiments, the analyzer may learn the model based on changes in the measured templates with respect to various factors as described in more detail below.

Figure 12:
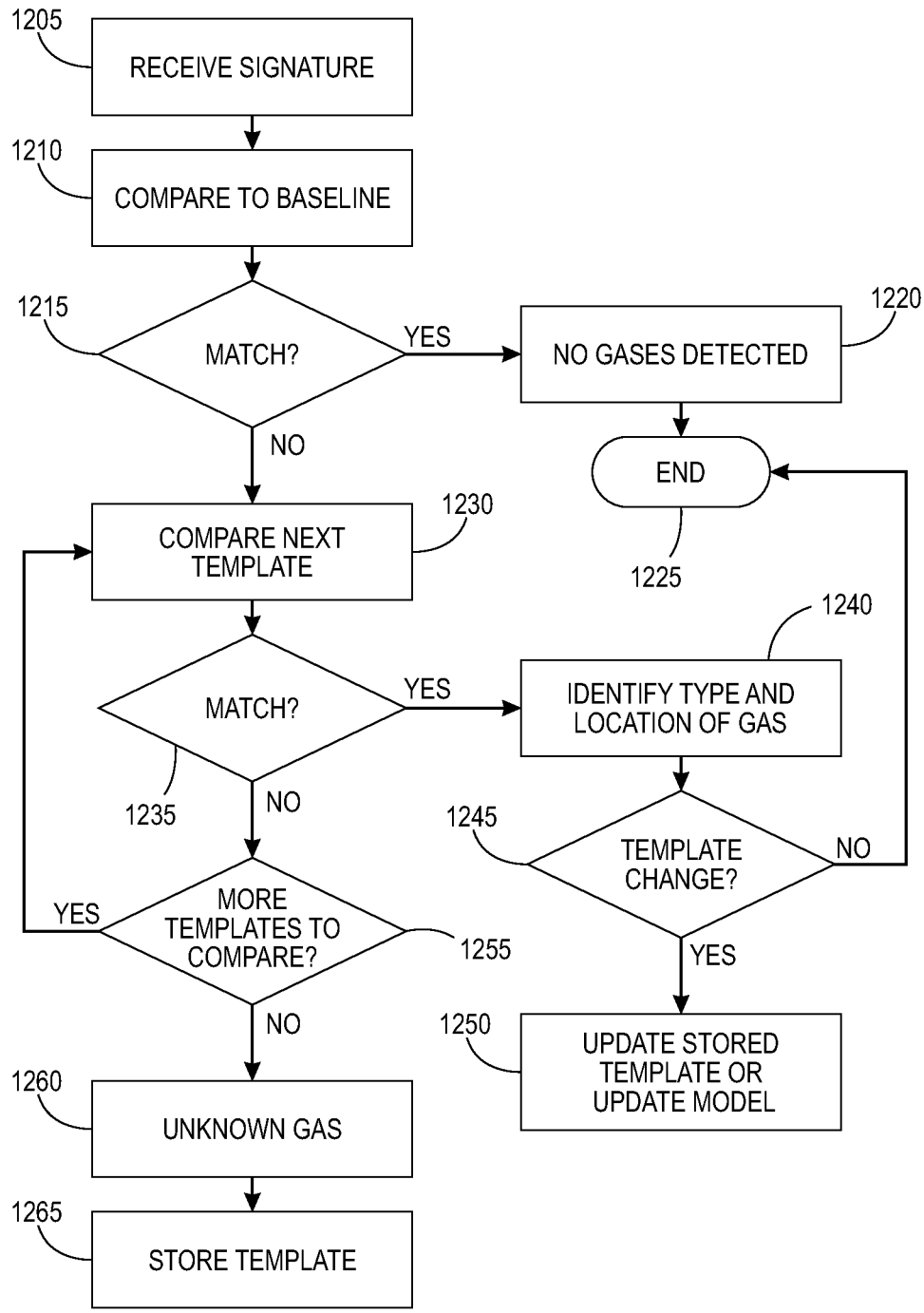
FIG. 12 is a flow graph that illustrates analysis of a measured signature and an approach for learning additional template signatures.

FIG. 12 is a flow graph that illustrates analysis of a measured signature. FIG. 12 also illustrates an approach for learning additional template signatures (or developing a model) by associating measured templates of unknown analytes with user input. After the unknown measured template is identified, e.g., by a user, the template and identifying information are stored in the template library for use in analyzing subsequent measured signatures. Additionally FIG. 12 illustrates an approach for updating the template signature library and/or updating a model of expected changes in the measured signatures due to factors such as ageing of the sensor unit.

According to the exemplary gas detection process illustrated in FIG. 12, after a measured signature is obtained 1205 by the analyzer, the measured signature is initially compared 1210 to a baseline template signature. If the baseline template signatures matches 1215 the measured signature, then the analyzer determines that no gases of interest are present 1220.

However, if the baseline templates do not match the measured signature, the analyzer compares 1230 each template in the selected template set to the measured signature until a match 1235 occurs or until all the template signatures have been compared 1255. For example, comparison of the template signatures to the measured signature may be achieved by calculating a waveform correlation coefficient for each comparison and determining if each calculated correlation coefficient is equal to or exceeds a threshold value. If the correlation coefficient is equal to or exceeds the threshold value, the analyzer determines a match condition and if the correlation coefficient is less than the threshold value, the analyzer determines an unmatched condition. If the analyzer determines that one of the template signatures matches one of the templates, the analyzer determines 1240 that the gas associated with the template signature is present at the sensor unit. The analyzer may additionally determine parameters such as the concentration of the gas, the location of the gas from the leak, a location of the source of the gas, the rate at which the gas is being released, and/or the direction of a gas leak, based on the sensor unit information signal from one or more sensor units. In some embodiments, the analyzer may provide a confidence value associated with each parameter determined by the analyzer for each gas detected.

In some embodiments, location and rate of the gas leak may be determined by analyzing multiple sensor unit information signals. For example, if the gas is present in a relatively large amount at the location of sensor unit 1, in a relatively smaller amount at the location of sensor unit 2, and in a relatively smallest amount as sensor unit 3, the analyzer may determine that the gas leak is closest to sensor unit 1 and is moving in the direction of sensor units 2 and 3. Based on the wind speed and the amount of gas present at sensor units 2 and 3, the analyzer may determine the rate of the leak. These or additional parameters of interest may be determined by the analyzer based on model-based or model-free statistical analysis techniques. The statistical analysis techniques include, but are not limited to, Maximum Likelihood Estimation (MLE) and/or Best Linear Unbiased Estimation (BLUE).

In some embodiments, the analyzer determines a set of concentration values for each gas of a set of gases of interest along with confidence metrics for each concentration value. This information is then fed into the MLE or BLUE or other analysis tool to determine the rate of the leak.

Some of the sensor elements may be designed to detect gases that potentially interfere with the detection of the target gases. Potentially interfering gases such as CO, $NO_x$, and $NH_3$ may be present in the environment and can lead to false positives reported by the sensor elements sensitive to a target gas, e.g., methane. The absence of interfering gases provides additional confidence in the detection of a target gas. Additionally or alternatively, detecting interfering gases helps to improve the accuracy of the sensor. For example, if a sensor element is sensitive both to target gas 1 and interfering gas 2 and a second element is sensitive only to interfering gas 2, the first sensor signal can be interpreted more accurately to detect the presence and/or concentration of the target gas 1 when the second sensor signal is used in conjunction with the first sensor signal.

In some embodiments, the analyzer may optionally adapt stored template signatures over time and/or may determine a model of expected changes of the sensor units. For example, if the correlation coefficient between a measured signature and a template signature shows relatively small, consistent, and predictable changes 1245, the analyzer may determine that such changes are due to ageing/degradation of the sensor elements of the sensor unit and may adapt the template signature to compensate for the age and/or compensation related changes. Similarly, the analyzer may determine that relatively small variations in the calculated correlation coefficient may be due to certain environmental or physical conditions that are present when the signature was measured. Under these circumstances, the analyzer may store a new template that characterizes the measured template under the environmental, physical, or temporal conditions. In this manner, the analyzer may "learn" the behavior of the sensors under the influences of environmental, physical and/or temporal conditions and may update 1250 a previously stored template and/or may develop a model to compensate for these influences.

Optionally, the analyzer may develop a new template signature when a previously unknown measured signature is encountered. If the measured signature does not match any of the stored template signatures, including the baseline, the analyzer may store the unknown signature and request a user enter identification data via the user interface. This identification data is associated with the previously unknown signature and the signature and identification data are stored in the template library. Subsequently, the analyzer may compare measured signatures to the new template to identify a gas characterized by the new template.

The user interface may also be used to input user preferences, e.g., preferences relating to how the measured signatures are analyzed. For example, a user may specify via the user interface which template signatures are compared to the measured signatures and/or the order in which template signatures are compared, e.g., from most likely to be present to least likely to be present or from most impactful, e.g., most volatile or dangerous gases, to less volatile or dangerous. Alternatively, the analyzer may determine the order of comparing the template signatures to the measured signatures. For example, the analyzer may compare the template signatures in order of frequency of detection.

Embodiments disclosed herein relate to an electronic sensor system that may contain both printed and conventional electronics. The printed portion of the system can includes multiple printed sensors, printed conductive interconnects, optionally printed thin-film transistors, resistors, capacitors, inductors, diodes, and other electronic components, and a printed antenna. The balance of the system, typically including components to read data from the sensors and to communicate the data wirelessly to a base station, may use conventional silicon integrated circuits.

In some embodiments, multiple such sensor units are deployed, each communicating its data to a single base station or to multiple base stations. The base station(s) may process the data themselves, or transfer the data to another receiver unit for processing. In some embodiments, the sensor units form a communication network in which data is transferred between the sensors, and ultimately to a base station which may not be in direct communication with each sensor. In yet other embodiments, the sensor units are distributed in a chain with each sensor unit communicating data to the subsequent sensor unit, with the final sensor unit communicating with the base station.

Embodiments described herein include a sensor network system comprising a sensor array that includes a plurality of sensor units. Each sensor unit comprises a plurality of sensor elements, wherein at least some of the sensor elements in the sensor unit that are sensitive to a gas or set of gases of interest are different in some functional respect from other sensor elements of the sensor unit that are sensitive to the gas or set of gases. Each sensor element is configured to generate an electrical signal in response to a chemical environment in the vicinity of the sensor unit. The set of electrical signals generated by the sensor elements of the sensor unit representing a measured signature of the environment in the vicinity of the sensor unit. The system includes aggregation circuitry configured to aggregate the electrical signals of the sensor elements into a sensor unit information signal. The sensor network system includes communication circuitry configured to wirelessly transmit the sensor information signal of the sensor unit to an external receiver and at least one base station communicatively coupled to the sensor array and configured to receive sensor information signals from each of the sensor units of the sensor array. The sensor network system includes an analyzer configured to extract the measured signatures of each sensor unit from the sensor unit information signals. The analyzer compares one or more template signatures associated respectively with one or more gases of interest to the measured signatures and detects presence of the one or more gases of interest based on comparison of the template signatures with the measured signatures. The gases of interest can include one or more of methane, ethane, propane, butane, $H_2S$, benzene.

For example, the analyzer may include a memory that stores a library of multiple template signatures corresponding respectively to multiple gases of interest along with a baseline template signature. According to some aspects, the sensor include resistive sensors configured to change resistivity in response to a presence of the one or more gases of interest. The resistive sensors may include conductive interdigitated electrodes bridged by the sensor material. At least one of the electrodes and/or the sensor material is printed may be printed. According to some aspects, the sensor material comprises carbon nanotubes which may be doped, functionalized, coated and/or otherwise modified to be sensitive to the one or more gases of interest. According to some aspects, the sensor material of the sensor elements comprises a metal oxide, such as tin oxide.

In some embodiments, at least some of the sensor elements in the sensor unit that are sensitive to a gas or set of gases of interest are have a different sensor material from the sensor material of other sensor elements of the sensor unit that are sensitive to the gas or set of gases. In some embodiments, at least some of the sensor elements in the sensor unit that are sensitive to a gas or set of gases of interest are a different type of sensor from the type of sensor used for the other sensor elements of the sensor unit that are sensitive to the gas or set of gases. For example, on type of useful sensor that may be used as a sensor element is an ion-selective field effect transistor (ISFET).

According to some embodiments, each sensor unit includes both printed and non-printed components. The non-printed components can include one or more of a battery, a passive electronic component, an integrated circuit, a wireless communications component, mechanical switches and a display. The non-printed components can be bonded to the substrate of the sensor unit using an epoxy, for example.

In some embodiments, each sensor element is a resistive sensor that is electrically connected to a resistor to form a voltage divider. According to some embodiments, the sensor unit includes printed thin film transistors configured to multiplex or otherwise condition sensor signals. Each sensor array can include an analog to digital converter (ADC) and a multiplexer configured to multiplex signals from each sensor unit to the ADC.

The sensor array may include redundant sensor units so that the sensor array remains at least partially operational if some sensor units fail. The sensor units may be placed at multiple locations and to determine the presence of gases and identify the gases at one or more location locations independent of wind direction. The analyzer may use model-based or model free statistical analysis of the sensor unit information signal to determine the presence and identity of the gases.

The sensor network is useful for installation along a gas pipeline, in a refinery, at a gas well head, or in other chemical facilities.

The analyzer can be configured to compare a library of known template signatures to measured signatures to identify the gas. In various implementations, the template signatures can be compared in order of importance, e.g., template signatures for volatile gases are compared before template signatures for non-volatile gases. Template signatures may be compared in order of recently detected gases or most frequently detected gases. Template signatures may be in an order specified by a user.

In some embodiments the template signature comparison takes into account one or more physical, environmental, and temporal factors. For example, the template library may include template signatures that take into account one or more of these factors. Alternatively or additionally, the analyzer may modify the template signatures in the library based on a model of expected changes in the measured signatures due to the physical, environmental, and/or temporal factors.

In some embodiments the analyzer is configured to learn a template signature by storing a measured signature generated by a sensor unit exposed to a particular gas of interest along with a user input identifying the particular gas of interest corresponding to the measured signature. In some embodiments, the analyzer may learn a new template signature that does not match the template signatures stored in the library. The analyzer may store the unmatched measured signature and send a message to a user requesting identification of the unmatched signature. If the user responds with the identification, the analyzer associates the identification with the measured signature and stores this information as a new template signature.

In some embodiments, the analyzer is configured to control some action that is taken if a particular gas is detected. For example, the analyzer may control fire sprinklers, fire extinguishers, blast doors, and/or may initiate other protective measures, such as turning on or off valves, stopping or reducing the flow of gas, initiating an alarm, and/or sending an alert message to a user, e.g., by voice mail, email, test messaging or other communication avenue.

Communication between the sensor units, base station, and analyzer may be arranged in various ways. The sensor array can be communicatively coupled to the base station through a wireless communication connection. In some configurations, the sensor array is arranged such that each of the sensor units wirelessly communicates with another sensor unit in a ring network and at least one sensor unit communicates with the base station. In some configurations, the sensor array is arranged such that each of the sensor units is configured to communicate directly with the base station or the analyzer. The sensor units may communicate through ad hoc or self-forming networks.

In some embodiments, at least some of the sensor units include a solar array and/or other energy harvesting components, e.g., wind or motion activated energy harvesting components that supply power to the sensor array. The sensor units may have a sleep mode to save energy. The sensor units may wake periodically, or when interrupted, e.g., by interrogation by the base station.

The sensor network system disclosed herein has been described using the example of detection of gases or gas leaks for a gas facility, e.g., well head, pipeline or refinery. Those skilled in the art will appreciate that the disclosed approaches are applicable to many other useful applications. For example, in some embodiments, a single sensor unit, or multiple sensor units can communicate directly with a "smart appliance", such as a smart refrigerator, or with a base station in communication with a smart appliance, or with a base station connected to a home or building network. In this case, the sensor may detect, for example a malfunctioning light, or presence of an unfavorable gas, such as from rotting food or a gas leak. In some embodiments the sensor units detect soil moisture and/or chemical composition. In some embodiments, a single sensor unit, or multiple sensor units, communicate with a vehicle. An example is distributed temperature sensors in the interior of the vehicle, or for detection of carbon monoxide or another dangerous gas.

In some embodiments, the sensor units may be interrogated using an RF signal, e.g., using RFID technology, wherein the RF interrogator signal supplies energy to the sensor unit allowing the sensor unit to respond by transmitting the sensor unit information signal. In some embodiments, the sensor unit may store time-stamped measured signatures and, when interrogated, transmit a sensor unit information signal that includes the time-stamped signatures to the interrogator. This embodiment may be useful for a user to interrogate the sensor units, e.g., disposed on boxes in a warehouse, to see what chemicals the sensor unit has previously been exposed to and at what levels.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. A sensor network system, comprising:
a sensor array, the sensor array comprising a plurality of sensor units, each sensor unit comprising:
a plurality of sensor elements, at least some of the sensor elements of the plurality of sensor elements in the sensor unit disposed on a first substrate and comprising a printed component, wherein the plurality of sensor elements comprises:
a first group of sensor elements being sensitive to a first gas of interest and at least one sensor element of the first group is different in some functional respect from other sensor elements of the first group; and
a second group of sensor elements being sensitive to a second gas of interest, wherein at least one sensor element is part of the first and second groups,
wherein each sensor element in the plurality is configured to generate an electrical signal in response to a chemical environment in the vicinity of the sensor unit, the electrical signals generated by the sensor elements of the sensor unit representing a measured signature of the environment in the vicinity of the sensor unit;
aggregation circuitry disposed on a second substrate electrically coupled to the first substrate and configured to aggregate the electrical signals of the sensor elements into a sensor unit information signal; and
communication circuitry disposed on the second substrate and configured to wirelessly transmit the sensor unit information signal to an external receiver;
at least one base station communicatively coupled to the sensor array and configured to receive sensor unit information signals from each of the sensor units of the sensor array; and
an analyzer configured to extract the measured signature of each sensor unit from the sensor unit information signals and to detect presence and concentration of one or more gases of interest based on the measured signatures.

2. The system of claim 1, wherein the analyzer is configured to determine confidence information for the presence and concentration of the gases of interest.

3. The system of claim 1, wherein the system is further configured to detect one or more gases that interfere with detection of the gases of interest and the analyzer is configured to detect the presence and concentration of the gases of interest using information about the interfering gases.

4. The system of claim 1, wherein the analyzer is configured to compare template signatures associated respectively with the gases of interest to the measured signatures and to detect presence and concentration of the gases of interest based on comparison of the template signatures with the measured signatures.

5. The system of claim 1, wherein the analyzer is configured to develop a model of the one or more gases of interest by machine learning and is further configured to detect presence and concentration of the gases of interest based on the model.

6. The system of claim 1, wherein the plurality of sensor elements comprises resistive sensors having conductive interdigitated electrodes bridged by a sensor material wherein at least one of the electrodes and the sensor material is printed.

7. The system of claim 6, wherein the sensor material comprises carbon nanotubes with dopants or a metal oxide.

8. The system of claim 1, wherein each sensor unit includes both printed and non-printed components, wherein the non-printed components include one or more of a battery, a passive electronic component, an integrated circuit, a wireless communications component, and a mechanical switch.

9. The system of claim 1, wherein the sensor array is arranged such that each of the sensor units communicates with another sensor unit of the sensor array in a ring network and one sensor unit of the sensor array communicates with the base station or each of the sensor units communicates with the base station.

10. The system of claim 1, wherein the sensor units are wirelessly coupled to the base station.

11. The system of claim 1, wherein at least one of the base station and the sensor units include one or more environmental sensors.

12. The system of claim 1, wherein the sensor array includes at least one of:
an energy harvesting component that supplies power to one or more sensor units;
an analog to digital converter (ADC) and a multiplexer configured to multiplex signals from each sensor unit to the ADC; and
redundant sensor units such that the sensor array remains operational if some sensor units of the sensor array fail.

13. The system of claim 1, wherein the sensor units are configured to be placed at multiple locations and to detect gases at multiple locations independent of wind direction.

14. The system of claim 1, wherein the analyzer is configured to provide information about one or more of a location of a gas leak, a direction of the gas leak, and a rate at which gas is being released from the gas leak.

15. The system of claim 14, wherein the analyzer is configured to implement a parametric statistical method to provide the information.

16. The system of claim 14, wherein the analyzer is configured to implement a non-parametric statistical method to provide the information.

17. The system of claim 1, wherein at least one of the sensor elements does not comprise carbon nanotubes and at least one of the sensor elements comprises carbon nanotubes.

18. A method, comprising:
sensing using multiple sensor elements, at least some of the sensor elements of the multiple sensor elements disposed on a first substrate and comprising a printed component and at least some of the sensor elements of the multiple sensor elements being part of a first group of sensor elements sensitive to a first analyte of interest where at least one sensor element in the first group is different in some functional respect from at least one other sensor element in the first group, and some of the other sensor elements are part of a second group of sensor elements sensitive to a second analyte of interest where at least one sensor element is part of the first and second groups;
generating electrical output signals from the sensor elements in response to the sensing, the electrical output signals generated by the sensor elements of a sensor unit representing a measured signature of the environment in the vicinity of the sensor unit;
aggregating the electrical output signals using aggregation circuitry disposed on a second substrate electrically coupled to the first substrate into a sensor unit information signal that includes the measured signature;
transmitting the sensor unit information signal from the sensor unit;
receiving, in a base station, a plurality of sensor unit information signals from multiple sensor units, each sensor unit information signal including a respective measured signature;
extracting each of the measured signatures from the respective sensor unit information signals; and
determining a presence and concentration of the first and second analytes based on analysis of the extracted measured signatures.

19. The method of claim 18, wherein determining the presence and concentration of the first and second analytes comprises:
comparing the extracted measured signatures to template signatures and determining the presence and concentration based on the comparing; and
updating the template signatures and/or learning new signatures based on the measured signatures.

20. The method of claim 18, wherein determining the presence and concentration of the first and second analytes comprises determining the presence and concentration based on a model developed by machine learning.

21. The method of claim 18, further comprising providing information about one or more of a location of a gas leak and a rate at which gas is being released from the gas leak.

* * * * *